United States Patent
Lee et al.

(10) Patent No.: US 10,534,852 B2
(45) Date of Patent: Jan. 14, 2020

(54) DISPLAY SYSTEM AND VIRTUAL WEB DEVICE IN THE CLOUD

(71) Applicant: SAMSUNG DISPLAY CO. LTD., Yongin-si, Gyeonggi-Do (KR)

(72) Inventors: Janghwan Lee, Pleasanton, CA (US); Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 267 days.

(21) Appl. No.: 15/215,512

(22) Filed: Jul. 20, 2016

(65) Prior Publication Data

US 2017/0091160 A1 Mar. 30, 2017

Related U.S. Application Data

(60) Provisional application No. 62/234,903, filed on Sep. 30, 2015.

(51) Int. Cl.
| | |
|---|---|
| *G06F 17/22* | (2006.01) |
| *G06F 17/21* | (2006.01) |
| *G06F 17/27* | (2006.01) |
| *H04L 29/08* | (2006.01) |

(52) U.S. Cl.
CPC ........ *G06F 17/2247* (2013.01); *G06F 17/212* (2013.01); *G06F 17/2241* (2013.01); *G06F 17/2705* (2013.01); *H04L 67/02* (2013.01); *H04L 67/10* (2013.01); *H04L 67/125* (2013.01)

(58) Field of Classification Search
CPC ............... G06F 17/212; G06F 17/2241; G06F 17/2247; G06F 17/2705; H04L 67/02; H04L 67/10; H04L 67/125
See application file for complete search history.

(56) References Cited

U.S. PATENT DOCUMENTS

| | | | |
|---|---|---|---|
| 7,370,120 B2* | 5/2008 | Kirsch | H04L 29/06 380/269 |
| 8,539,338 B2 | 9/2013 | Zhu et al. | |
| 8,607,288 B2* | 12/2013 | Abdolsalehi | H04L 12/1813 709/203 |
| 8,676,848 B2* | 3/2014 | Balani | G06F 9/5072 707/790 |
| 8,711,147 B2 | 4/2014 | Breeds et al. | |
| 8,782,189 B2* | 7/2014 | Akiyama | H04L 12/14 709/223 |
| 8,924,511 B2* | 12/2014 | Brand | H04L 67/1097 709/218 |

(Continued)

*Primary Examiner* — Maikhanh Nguyen
(74) *Attorney, Agent, or Firm* — Lewis Roca Rothgerber Christie LLP

(57) ABSTRACT

A virtual device for processing Web-based content to be displayed on a remote rendering device includes: a processor implemented by one or more cloud resources; and a memory, and the memory stores instructions that, when executed, cause the processor to: receive the content; detect an attribute of the remote rendering device and process the content according to the detected attribute; analyze the content to construct a render tree corresponding to the content; prepare render tree data for rendering by the remote rendering device, the render tree data corresponding to the constructed render tree; and transmit the render tree data over a communication network to the remote rendering device.

17 Claims, 7 Drawing Sheets

(56) References Cited

U.S. PATENT DOCUMENTS

| | | | |
|---|---|---|---|
| 8,958,483 B2* | 2/2015 | Dhawan | H04N 9/87 375/240.01 |
| 9,064,010 B2* | 6/2015 | Maharajh | G06Q 10/10 |
| 9,064,028 B2* | 6/2015 | Shen | H04L 67/2828 |
| 9,910,499 B2* | 3/2018 | Adzhigirey | G06F 3/04815 |
| 10,031,728 B2* | 7/2018 | de Andrade | H04L 69/08 |
| 2002/0037035 A1* | 3/2002 | Singh | H03M 7/30 375/240 |
| 2003/0035386 A1* | 2/2003 | Sullivan | H04B 7/18584 370/316 |
| 2003/0110296 A1* | 6/2003 | Kirsch | H04L 29/06 709/246 |
| 2003/0191623 A1* | 10/2003 | Salmonsen | H04L 12/283 703/24 |
| 2004/0027380 A1* | 2/2004 | Takahashi | H04N 5/44543 715/764 |
| 2004/0049598 A1* | 3/2004 | Tucker | H04L 67/2819 709/246 |
| 2007/0250597 A1* | 10/2007 | Resner | H04N 7/17318 709/218 |
| 2008/0177825 A1* | 7/2008 | Dubinko | G06F 17/217 709/203 |
| 2008/0207182 A1* | 8/2008 | Maharajh | G06Q 10/10 455/414.1 |
| 2008/0222273 A1 | 9/2008 | Lakshmanan et al. | |
| 2009/0063530 A1* | 3/2009 | Lee | G06F 17/30899 |
| 2010/0077321 A1* | 3/2010 | Shen | H04L 67/2828 715/760 |
| 2011/0131309 A1* | 6/2011 | Akiyama | H04L 12/14 709/223 |
| 2011/0276713 A1* | 11/2011 | Brand | H04L 67/1097 709/232 |
| 2011/0307523 A1* | 12/2011 | Balani | G06F 9/5072 707/802 |
| 2012/0030631 A1* | 2/2012 | Gonzalez | G06F 3/0482 715/854 |
| 2013/0246906 A1 | 9/2013 | Hamon | |
| 2013/0254675 A1* | 9/2013 | de Andrade | H04L 69/08 715/746 |
| 2013/0268843 A1 | 10/2013 | Zu et al. | |
| 2013/0336316 A1* | 12/2013 | Sudhaakar | H04L 45/16 370/390 |
| 2014/0029916 A1* | 1/2014 | Dhawan | H04N 9/87 386/248 |
| 2014/0198024 A1* | 7/2014 | Adzhigirey | G06F 3/04815 345/156 |
| 2014/0337708 A1 | 11/2014 | Cho et al. | |
| 2015/0029880 A1* | 1/2015 | Burns | H04W 4/70 370/252 |
| 2015/0081798 A1* | 3/2015 | Lee | H04L 67/2809 709/205 |
| 2016/0012152 A1* | 1/2016 | Johnson | G06F 17/30958 707/798 |
| 2016/0056972 A1* | 2/2016 | Oh | H04L 12/2809 709/226 |
| 2017/0091159 A1* | 3/2017 | Su | G06F 17/2247 |

* cited by examiner

DISPLAY SYSTEM AND VIRTUAL WEB DEVICE IN THE CLOUD

CROSS-REFERENCE TO RELATED APPLICATION

This patent application claims priority to and the benefit of U.S. Provisional Application Ser. No. 62/234,903, filed Sep. 30, 2015, titled "Display System for Virtual Web Device in the cloud," the entire content of which is incorporated herein by reference.

FIELD

Embodiments of the present invention relate to content processing and display systems, and more particularly, to remote display systems.

BACKGROUND

Cloud computing provides users with enhanced capabilities for retrieving, processing, and storing data using any device connected to the Internet. One application of cloud computing is the use of the cloud to support devices and data associated with an Internet of Things (IoT), a group of physical objects that collect and exchange data over a network. The Web of Things (WoT) uses software standards and protocols (e.g., Representational State Transfer (REST), Hypertext Transfer Protocol (HTTP), and Uniform Resource Identifiers (URIs)) to enable networked objects of the IoT to interact with the World Wide Web and to communicate with each other using Web standards. The WoT also provides a way for users to access data shared over the IoT.

Cloud computing and the WoT generate large amounts of diverse content that can be stored, managed, and processed. This content may include robust, rich multimedia content such as movies, games, slide presentations and music, but may also include more straightforward content such as business documents or files. Users may access and manipulate this content on demand using any number of client devices enabled with web connectivity (e.g., a desktop computer, a laptop, a mobile phone, or a tablet), regardless of the user's location. Moreover, the same content can be concurrently (e.g., simultaneously) presented on multiple devices. However, the form factor of a user's display device, which is attributable to physical characteristics of the device such as its size, shape, layout, and styling, limits the device's ability to optimally display a wide variety of content. Therefore, a person accessing Web-based content (including WoT data) on his or her device may find that the content or data is not properly presented when accessed on a different device. A remote display system that can properly present (e.g., display) a wide variety of content on a number of different devices, regardless of form factor, is desirable.

The above information disclosed in this Background section is only to enhance understanding of the background of the invention, and therefore it may contain information that does not constitute prior art.

SUMMARY

Aspects of some embodiments of the present invention relate to a system and method for processing and displaying Web-based content, including WoT data.

According to an embodiment of the present invention, a virtual device for processing Web-based content to be displayed on a remote rendering device includes: a processor implemented by one or more cloud resources; and a memory, and the memory stores instructions that, when executed, cause the processor to: receive the Web-based content; detect an attribute of the remote rendering device and process the Web-based content according to the detected attribute; analyze the Web-based content to construct a render tree corresponding to the content; prepare render tree data for rendering by the remote rendering device, the render tree data corresponding to the constructed render tree; and transmit the render tree data over a communication network to the remote rendering device.

The instructions that cause the processor to prepare the render tree data may include instructions for packetizing the render tree into data packets prior to transmission of the render tree data.

The instructions that cause the processor to transmit the render tree data may include instructions for transmitting the render tree data to a plurality of remote rendering devices having differing form factors from one another.

The detected attribute may include form factor data of each of the remote rendering devices and the render tree may be constructed based on the form factor data.

The detected attribute may include an encoding format of each of the remote rendering devices and the instructions that cause the processor to process the content may include instructions for transcoding the content based on the detected encoding format.

The instructions, when executed, may further cause the processor to receive input event data from the remote rendering device and to update a user interface of the virtual device based on the input event data.

The instructions, when executed, may further cause the processor to reserve rendering of the content for the remote rendering device.

The Web-based content may include Web of Things (WoT) data generated by a remote WoT device.

According to another embodiment of the present invention, a rendering device for displaying Web-based content includes: a processor; and a memory, and the memory stores instructions that, when executed, cause the processor to: receive, over a communication network, data packets corresponding to a render tree constructed by a cloud resource, the render tree representing the Web-based content; reconstruct the render tree from the data packets; compute layout data of nodes of the render tree, the nodes representing a structure of the Web-based content; and traverse the render tree to paint the nodes on a display screen of the rendering device.

The instructions, when executed, may further cause the processor to transmit, over the communication network, information about the rendering device to the cloud resource.

The information about the rendering device may include information corresponding to at least one of: form factor data of the rendering device, a supported video codec, a supported audio codec, Web Graphics Library (WebGL) support, or Web Computing Language (WebCL) support.

The instructions that cause the processor to receive the data packets from the cloud resource may include instructions for de-packetizing the data packets.

The instructions, when executed, may further cause the processor to receive input event data from an input device, and to transmit the input event data to the cloud resource.

The rendering device may be a display-only device.

The rendering device may be devoid of a DOM tree constructor.

The Web-based content may include WoT data.

According to another embodiment of the present invention, a Web of Things (WoT) device for processing WoT data to be displayed on a remote rendering device includes: a processor; and a memory, and the memory stores instructions that, when executed, cause the processor to: receive the WoT data; analyze the WoT data to construct a render tree corresponding to the WoT data; prepare render tree data for rendering by the remote rendering device, the render tree data corresponding to the constructed render tree; and transmit the render tree data over a communication network to the remote rendering device.

The WoT data may be generated by one or more other WoT devices and may be received by the WoT device over the communication network.

The WoT data may include data written in HyperText Markup Language (HTML), and the instructions, when executed, may further cause the processor to generate at least one of audio data or video data for displaying the WoT data on the remote rendering device in an audio format, visual format, or an audiovisual format.

The instructions, when executed, may further cause the processor to detect an attribute of the remote rendering device and to process the WoT data according to the detected attribute.

According to another embodiment of the present invention, a system for processing Web-based content to be displayed includes: a first processor implemented on one or more cloud resources; a second processor on a remote rendering device; and a memory, and the memory stores instructions that, when executed, cause the first processor to: receive the Web-based content; detect an attribute of the remote rendering device and process the Web-based content according to the detected attribute; analyze the Web-based content to construct a render tree corresponding to the Web based content; and transmit render tree data corresponding to the constructed render tree over a communication network, to the remote rendering device, and the memory further stores instructions that, when executed, cause the second processor to: receive the render tree data as data packets; reconstruct the render tree from the data packets; compute layout data of nodes of the render tree, the nodes representing a structure of the Web-based content; and traverse the render tree to paint the nodes on a display screen of the remote rendering device.

BRIEF DESCRIPTION OF THE DRAWINGS

The accompanying drawings, together with the specification, illustrate example embodiments of the present invention, and, together with the description, serve to explain principles of embodiments of the present invention.

DETAILED DESCRIPTION

Figure 1:
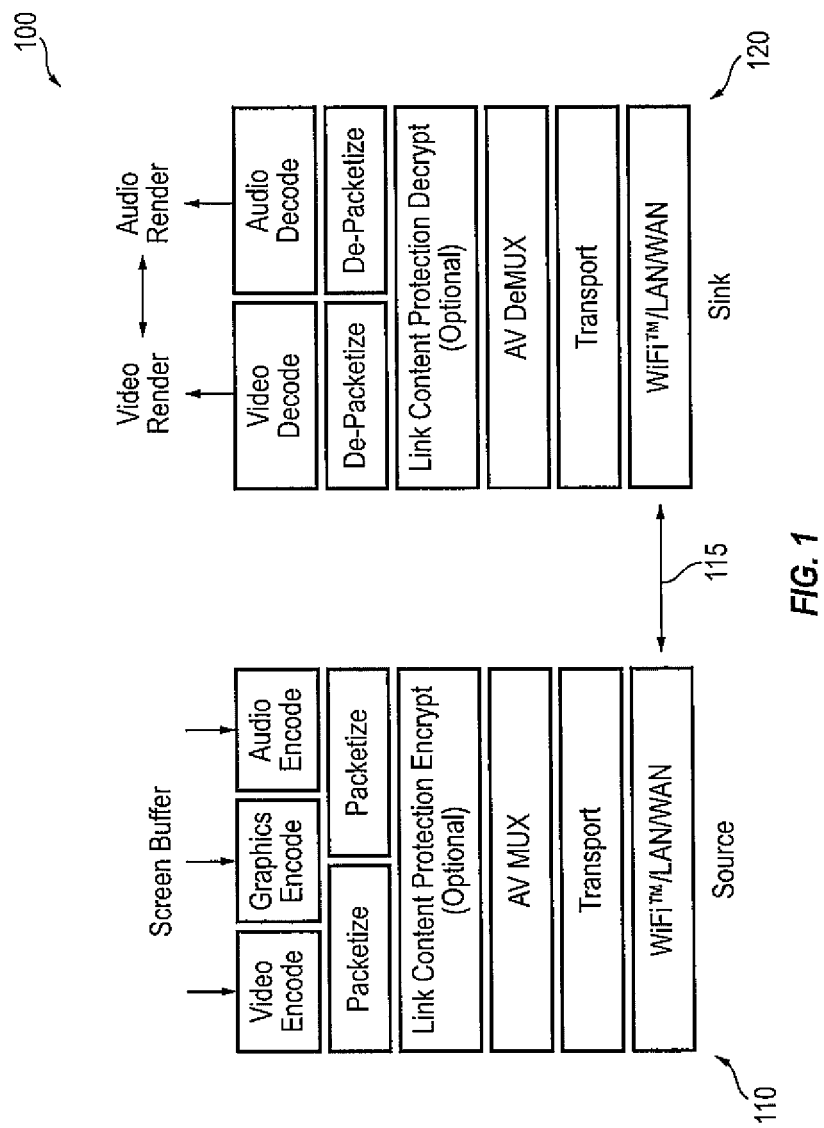
FIG. 1 illustrates a processing stack of an example remote display system.

Aspects and features of embodiments of the present invention, and methods of accomplishing the same, may be understood more readily by reference to the following detailed description of example embodiments and the accompanying drawings.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be more thorough and complete, and will more fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The virtual device (or virtual web device), rendering device (or display device), IoT device, WoT device, rendering engine, system for processing and displaying Web-based content, and/or any other relevant devices or components according to embodiments of the present invention described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or the like. Further, the various components of these devices may be a process or thread, running on one or more processors, in one or more computing devices, executing computer program instructions and interacting with other system components for performing the various functionalities described herein.

The computer program instructions may be stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that in some embodiments, the functionality of various computing devices may be combined or integrated into a single computing device, or the functionality of a particular computing device may be distributed across one or more other computing devices without departing from the spirit and scope of the exemplary embodiments of the present invention.

Aspects of some embodiments of the present invention relate to a system and method for processing and displaying Web-based content in cloud computing and WoT applications.

One feature of cloud computing is the ability to access and manipulate Web-based content on multiple devices, remotely and on demand. Users may do so through web browsers or native applications running on Web-enabled remote display devices (e.g., mobile devices).

FIG. 1 illustrates a processing stack of an example remote display system 100. The first device 110 may be a device such as a desktop computer, laptop, mobile phone, or tablet. In one example, a remote server (e.g., a remote server in the cloud) transmits Web-based content (e.g., audio, video, and graphics) over a network to the first device 110. For instance, a remote software application associated with the remote server may render, encode, and transmit the content to the first device 110 one frame at a time. The first device 110 decodes the frames as they are received and may store the decoded content in a screen buffer for display on a screen of the device.

Content decoded by and displayed on the screen of the first device 110 can also be displayed on other remote display devices. For example, content such as documents, movies, photographs, or music streamed from the cloud and presented (e.g., displayed) on the first device 110 may be concurrently (e.g., simultaneously) presented on a second device 120. The second device 120 may be a device such as a television, home audio entertainment system, monitor, or tablet.

One approach for concurrent display involves mirroring a screen of the first device 110 (the "source device") on a screen of the second device 120 (the "sink device"). In order to mirror the screen of the first device 110 onto a screen of the second device 120, the first device 110 re-encodes the content stored in its screen buffer, optionally encrypts the content, and multiplexes the audio data with the video data. The first device 110 then packetizes the content into data packets and transmits the data packets to the second device 120 via a wired or wireless connection 115 connected to a network (e.g., WiFi, a local area network (LAN), or a wide area network (WAN)). This mirroring process may be performed one frame at a time. As each frame is received by the second device 120, the second device 120 de-packetizes the data packets, demultiplexes the audio data from the video data, decrypts the content if it was encrypted by the first device 110, and decodes the content to mirror the screen of the first device 110 on the screen of the second device 120.

In the approach illustrated in FIG. 1, the rate at which the second device 120 receives the content may be limited in part by the bandwidth and latency of the network over which the first device 110 and the second device 120 are connected. When the remote display system 100 encodes and transmits an entire frame (or the entire screen) to the second device 120, a corresponding amount of bandwidth is occupied each time encoded data is transmitted between devices. The remote display system 100 may also have latency issues for screen encoding using a media framework such as block-based encoding.

Additionally, a typical component of web browsers and other applications that provide Web-based content is a web browser engine. The web browser engine generally includes a rendering engine for rendering marked-up content (e.g., HTML, XML, image files, etc.) and related formatting information (e.g., CSS, XSL, etc.). Referring to FIG. 1, in order to mirror Web-based content onto the second device 120, the first device 110 may first perform an entire web browser implementation, including decoding and rendering the Web-based content received from a remote Web server, and may generate a screenshot to be mirrored onto the second device 120. The first device 110 then re-encodes, encrypts, and packetizes the screenshot for transmission to the second device 120. The second device 120 then performs decoding, decrypting, and de-packetizing processes on the received screenshot. Each step of these processes consumes processing power and time. As such, both the first device 110 and the second device 120 utilize a certain amount of processing power to carry out the approach illustrated in FIG. 1. Further, a user may find that the Web-based content or data, once mirrored onto the second device 120, is not properly displayed on the second device 120 due to form factor constraints of the first device 110 and/or the second device 120.

Aspects of some embodiments of the present invention relate to a new approach for processing and displaying Web-based content (e.g., in cloud computing and WoT applications). In a remote display system according to an embodiment, a rendering engine (or rendering pipeline) on a client side is distributed (or separated) across two devices: a virtual device (or a virtual web device or a virtual machine) based in the cloud, and a remote rendering device. According to an aspect of some embodiments of the present invention, content is rendered locally by a remote rendering device, rather than being first rendered in a full browser implementation by a source device and then mirrored onto a sink device. As such, according to an embodiment, neither the virtual device nor the remote rendering device performs an entire web browser implementation. Presentation of content on the remote rendering device therefore avoids the bandwidth, latency, and processing power and time issues described above with respect to FIG. 1.

Figure 2:
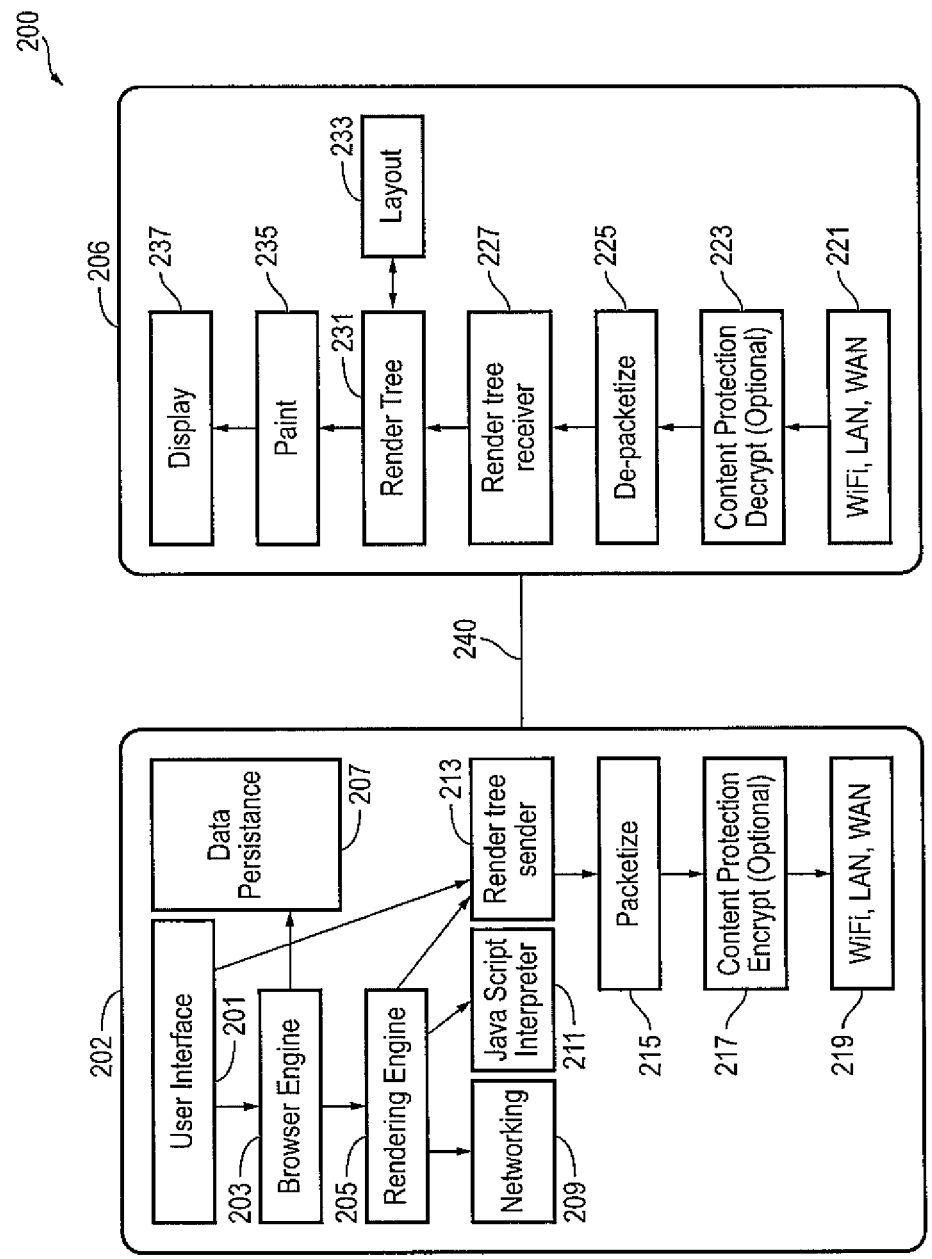
FIG. 2 illustrates a system architecture of a system for processing and displaying Web-based content according to an embodiment of the present invention.

FIG. 2 illustrates a system architecture of a system and method for processing and displaying Web-based content according to an embodiment of the present invention. As shown, the system 200 includes a virtual web device 202 and a remote rendering device 206. The virtual web device 202 has several subsystems, including a user interface 201, a browser engine 203, a virtual rendering engine 205, a data storage (or data persistence) unit 207, a networking layer 209, a programming language interpreter 211 (e.g., a JavaScript interpreter), a render tree sender 213, a packetizer 215, a content protection unit 217, and a network connector 219. The subsystems of the virtual web device 202 may be implemented utilizing one or more computing resources (e.g., networks, servers, storage, applications, and services) operating in the cloud (or cloud resources).

The remote rendering device 206 also has several subsystems, including a network connector 221, a content protection unit 223, a depacketizer 225, a render tree receiver 227, a render tree 231, a layout calculator 233, a painter 235, and a display screen 237. The virtual web device 202 and the remote rendering device 206 communicate over a communication network 240 via their respective network connectors 219 and 221. The communication network 240 may include any suitable communication network, such as Wi-Fi, LAN, and/or WAN. The subsystems of the remote rendering device may be implemented utilizing one or more processors of the device executing instructions stored in memory. The system 200 may further include a plurality of remote rendering devices 206, and the remote rendering devices 206 may have differing form factors from one another.

FIG. 2 also shows processing stacks for the virtual web device 202 and the remote rendering device 206, according to an embodiment.

Referring to the virtual web device 202, in one embodiment, the user interface 201 includes browser components that allow a user to interact with the browser engine 203 such as an address bar, forward and back buttons, and a bookmarking menu. The browser interface 203 receives a user's request for content via the user interface 201.

The browser engine 203 serves as an interface for querying and manipulating the virtual rendering engine 205. The browser engine 203 also saves data (e.g., persistent data such as cookies) to the data storage unit (or data persistence unit) 207. The virtual rendering engine 205 calls on the networking layer 209 in response to receiving requests from the browser engine 203. The networking layer 209 provides the requested content received from Web-based resources (e.g., in the cloud) in response to network calls (e.g., HTTP requests) from the virtual rendering engine 205. The virtual rendering engine 205 receives Web-based content (e.g., audio, video, graphics) from the networking layer 209, and analyzes (or interprets) the content and related formatting information using the programming language interpreter 211, which parses and executes programming language code (e.g., JavaScript code). The rendering engine 205 utilizes the content and formatting information to construct a render tree (or frame tree).

Figure 3:
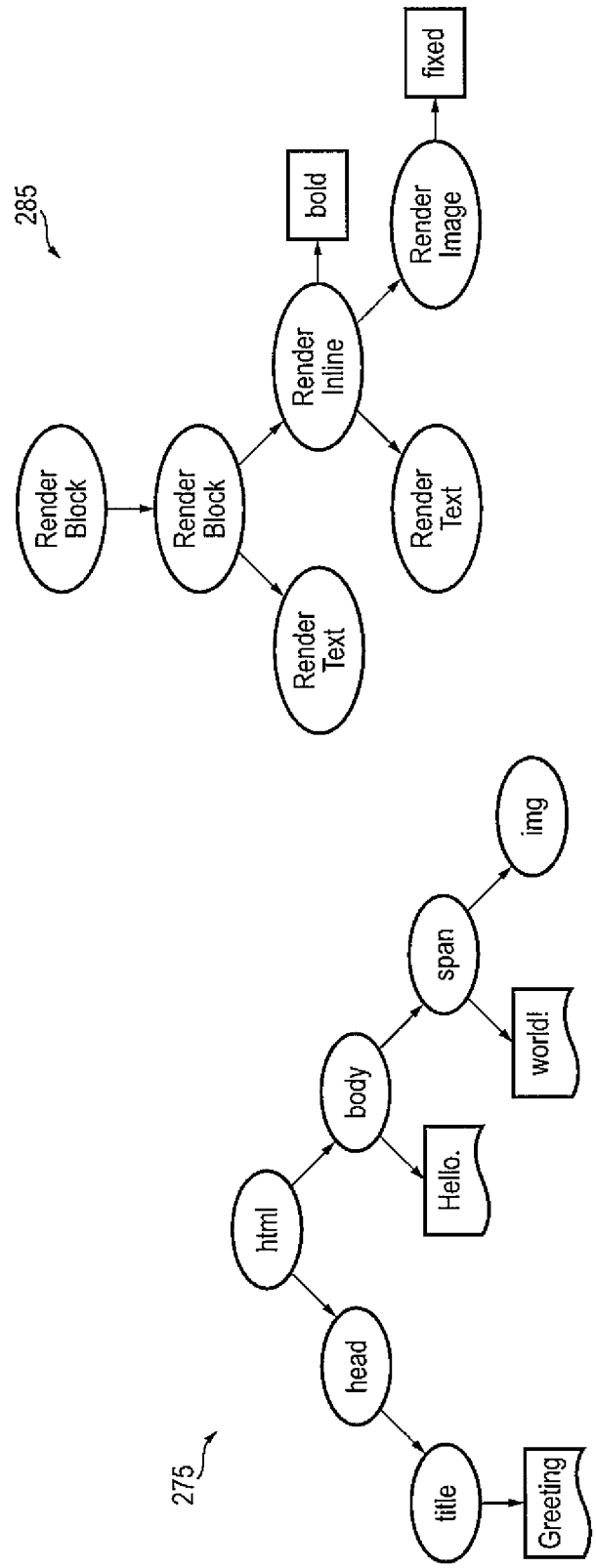
FIG. 3 illustrates an example DOM tree and an example render tree according to an embodiment of the present invention.

A process of constructing a render tree will now be described. The virtual rendering engine 205 constructs the render tree by converting the content (e.g., HTML, XML, and image files) to Document Object Module (DOM) nodes and creating a DOM tree. This process is referred to herein as DOM processing. An example DOM tree 275 is illustrated in FIG. 3. The DOM tree provides a representation of the individual elements and content in a document (e.g., a web page) as a structured group of nodes and objects, and allows for those nodes and objects to be accessed by programs for retrieving and setting the properties of those objects. The virtual rendering engine 205 also processes formatting (or style) information (e.g., CSS, XSL, etc.), by parsing it into the CSS Object Module (CSSOM). The virtual rendering engine 205 combines the DOM tree with the formatting information to create a render tree.

An example render tree 285 is illustrated in FIG. 3. The resulting render tree is a hierarchical representation of the structure of the content and its formatting. In one embodiment, the render tree is comprised of one or more nodes (or render blocks), each node representing an element, an attribute (e.g., a visual attribute such as color or dimensions), or some other object associated with the represented content. The nodes are ordered according to how the corresponding content will be displayed on the screen of the remote rendering device.

Figure 4:
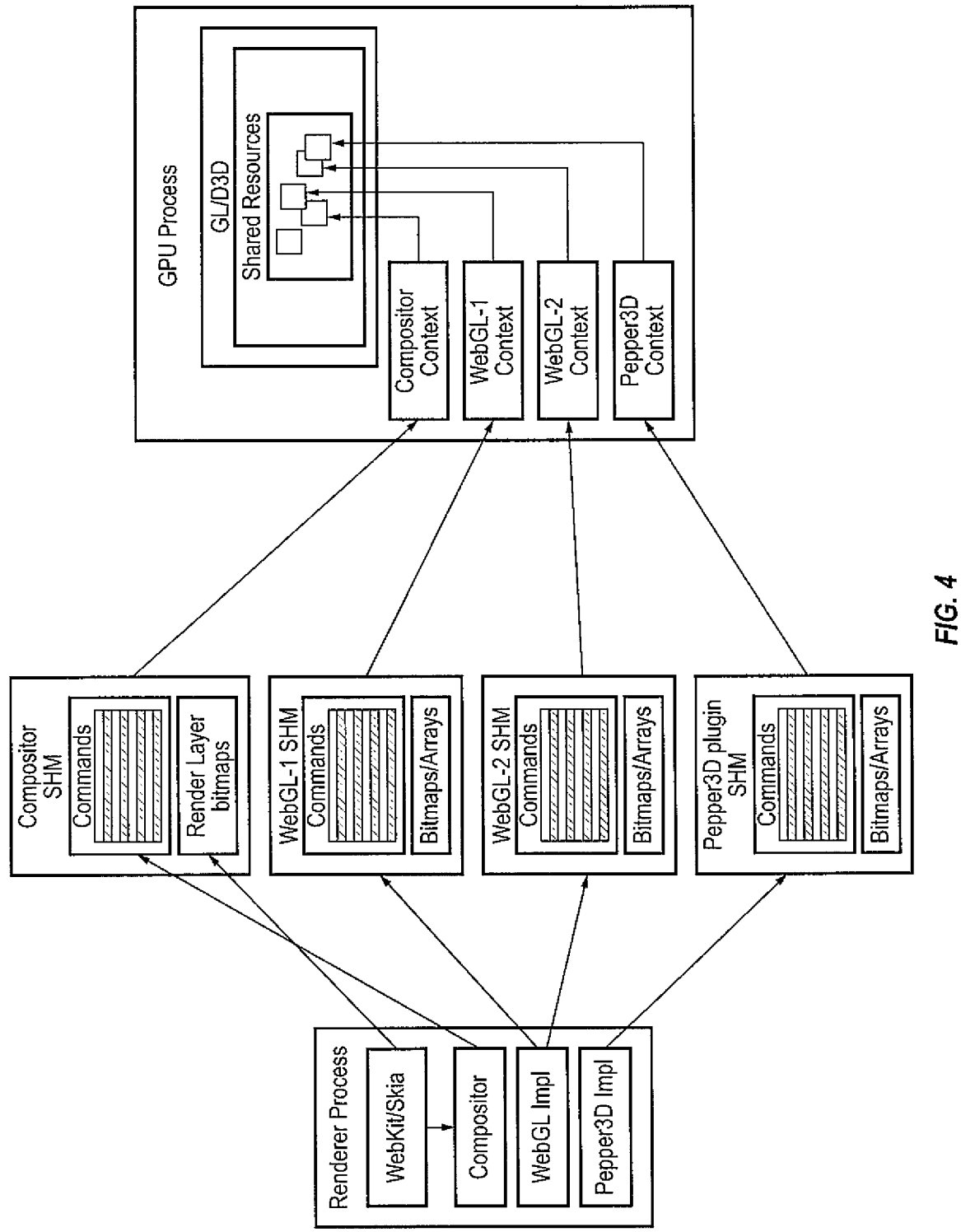
FIG. 4 illustrates an example render tree structure according to an embodiment of the present invention.

The render tree may include more than one render block, and each render block may in turn have a render tree structure as illustrated in FIG. 4. For example, one block could correspond to video, audio, Web Graphics Library (WebGL), or Web Computing Language (WebCL), and may include instructions (e.g., special handling instructions) for rendering to be performed by the remote rendering device 206.

The render tree sender 213 receives render tree data corresponding to the constructed render tree from the rendering engine 205 and prepares the render tree data for rendering by the remote rendering device 206. The packetizer 215 forms the render tree data into data packets for transmission. The render tree sender 213 may also include user interface data as part of the render tree data. The content protection unit 217 may be optionally included for encrypting the render tree data packets prior to transmission. The virtual web device 202 may also optionally compress the render tree data packets prior to transmission. After preparing the render tree data (or render tree data packets), the render tree sender 213 transmits the render tree data over a communication network 240 to one or more remote rendering devices 206.

In one embodiment, the virtual web device 202 constructs and transmits portions of the render tree to the remote rendering device 206 as content is received from the networking layer 209, rather than waiting for all of the content to be parsed.

According to an aspect of some embodiments of the present invention, rather than perform a traditional browser implementation as a typical source device would, the virtual web device 202 provides the render tree data to the remote rendering device 206 as un-rendered data and reserves rendering for the remote rendering device 206. That is, the virtual web device 202 does not fully render the content for display by traversing the render tree, does not paint the content on a screen, and does not mirror a screenshot of an entire browser screen onto another device.

According to other embodiments of the present invention, the virtual web device 202 may perform some rendering of content. However, in such embodiments, the virtual web device 202 still sends only the render tree data, rather than a screenshot of an entire browser screen, to the remote rendering device 206.

A process of displaying Web-based content on the remote rendering device 206 will now be described with reference to FIG. 2. The remote rendering device 206 receives, over the communication network 240, the render tree data corresponding to the render tree constructed by the virtual web device 202. As discussed above, the received render tree data corresponds to a render tree rather than a screenshot of an entire browser screen. The content protection unit 223 may be optionally included to decrypt the received data packets if they were received in an encrypted form. The remote rendering device 206 may also optionally decompress the received data packets if they were received in a compressed form.

The depacketizer 225 de-packetizes the received data packets to obtain the render tree data sent by the render tree sender 213 of the virtual web device 202. The depacketizer 225 provides the reconstructed render tree data to the render tree receiver 227. In the reconstructed render tree 231, the nodes represent a structure of the Web-based content. The remote rendering device 206 utilizes the render tree 231 as input to a layout calculator 233, which performs a layout process to compute (or determine) layout data (e.g., position information) of nodes of the reconstructed render tree 231. The layout process computes layout data of each visible element of the content. In one embodiment, the layout data includes size information and coordinates for each node, and the coordinates define a location where the content will appear on the display screen 237. The layout calculator 233 begins at the root of the render tree 231 and traverses each node of the tree to compute the layout data for each element. The layout process may be performed on the entire render tree (e.g., for global changes that affect all render blocks) or may be performed incrementally (e.g., when new render blocks are added to the render tree as a result of new content retrieved from the network layer 209).

The remote rendering device 206 provides the render tree 231 and the computed layout data to a painter 235. The painter 235 performs a painting process by traversing the render tree to paint each node. The painting process converts the render tree 231 to pixels that are displayed on the display screen 237 of the remote rendering device 206. As with the layout process, painting may be performed globally or incrementally.

According to an embodiment, the remote rendering device 206 may also transmit information about itself over the communication network 240, and the virtual web device 202 may detect this information. The information may relate to one or more attributes of the remote rendering device 206, such as form factor data, display resolution, supported video codec (e.g., H.264, H.265, etc., and profile: base, main, high), supported audio codec (e.g., AAC, HE-AAC, AC3, etc., and corresponding bitrates, etc.), WebGL, and WebCL support. The information about the remote rendering device 206 may also be communicated to (or shared with) other devices (e.g., display devices) having differing form factors, via the communication network 240.

The virtual web device 202 may detect attributes of the remote rendering device 206 (e.g., based on information received from the remote rendering device 206), and may process the content according to the detected attribute. For example, the virtual web device 202 may generate the render tree data based on form factor data of a particular remote rendering device, prior to transmitting the render tree data to that device. As such, the render tree data may be customized (or optimized) for the particular remote rendering device to which it is sent. As another example, the virtual web device 202 may detect an encoding format of the remote rendering device 206 and may perform transcoding of render tree data (e.g., video, audio, and other data formats) based on the detected attribute. To illustrate, in a case where the remote rendering device 206 supports only H.264 video codec and the content data is encoded in H.265 format, the virtual web device 202 may detect the mismatch in formats and transcode the video content from the H.265 format to the H.264 format, prior to transmitting the render tree data (or render tree data packets) to the remote rendering device 206.

Thus, according to an aspect of some embodiments of the present invention, a system and method for processing and displaying Web-based content avoids unnecessary decoding, rendering, and re-encoding of Web-based content (e.g., video and/or audio data). By preparing and transmitting customized render tree data (e.g., in advance) that can be decoded and rendered by individual recipient remote rendering devices, a remote display system according to an embodiment avoids the bandwidth, latency, and processing power and time issues of mirroring approaches.

Referring to FIG. 2, the remote rendering device 206 may have a user interface that displays parts of a web browser user interface such as the address bar, forward and back buttons, and bookmark menu. In some embodiments, part of the user interface backend may be included as part of the remote rendering device 206 for painting the nodes of the render tree 231.

According to one embodiment, the remote rendering device 206 may be utilized as a display-only device that operates without an input device (e.g., without a keyboard, a mouse, a scanner, or a digital camera).

Figure 5:
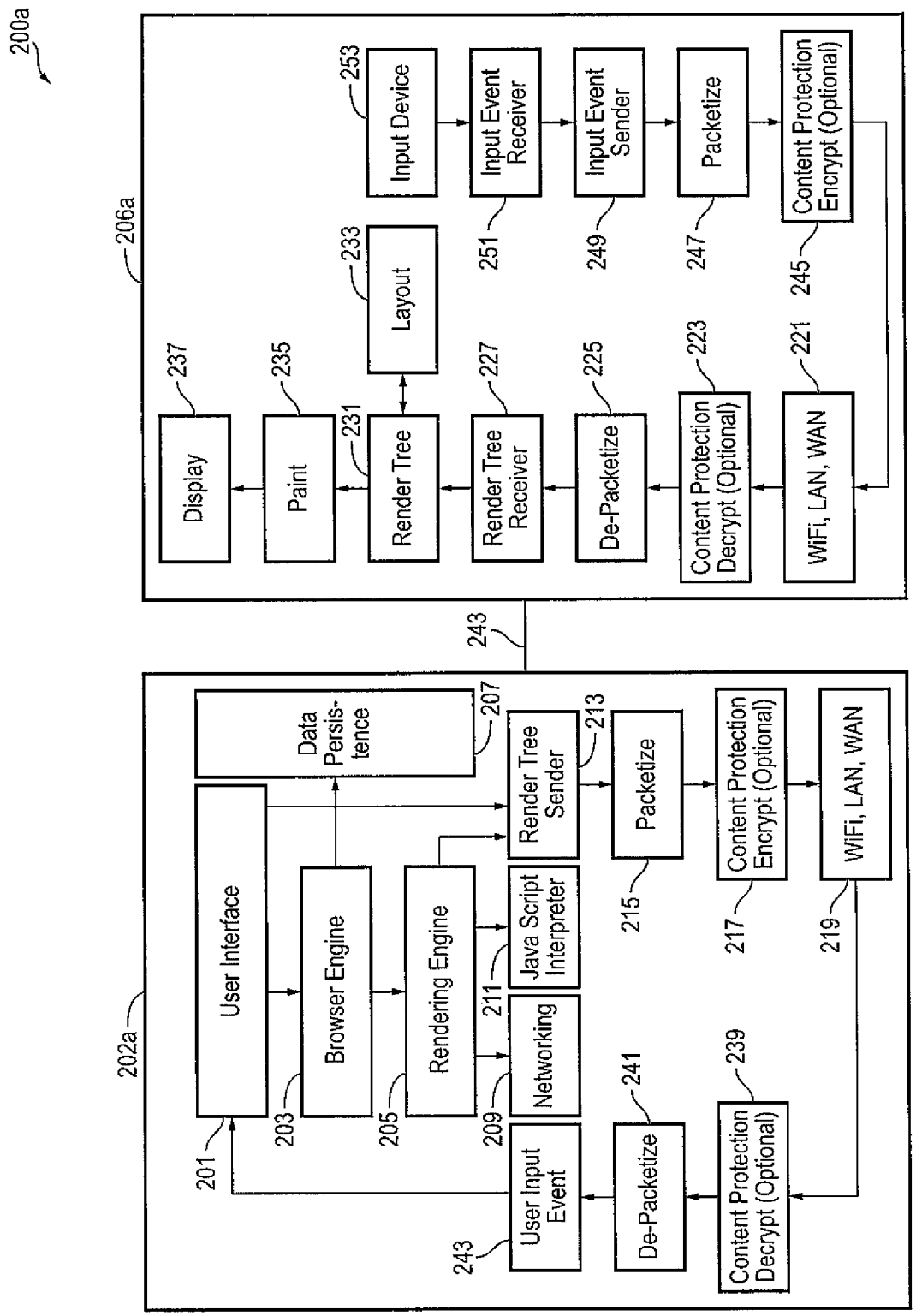
FIG. 5 illustrates a system architecture of a system for processing and displaying Web-based content according to another embodiment of the present invention.

In another embodiment, the remote rendering device 206 may include an input device for receiving a user input. FIG. 5 illustrates a system architecture of a system for processing and displaying Web-based content according to another embodiment of the present invention. The remote display system 200a includes a virtual web device 202a based in the cloud 204, and a remote rendering device 206a. The virtual web device 202a may include some components or perform functions that are substantially the same as or similar to those of the virtual web device 202 in FIG. 2, and the remote rendering device 206a may include some components or perform functions that are substantially the same as or similar to those of the remote rendering device 206 in FIG. 2. As such, descriptions of the same or similar components or functions may not be repeated.

In FIG. 5, the remote rendering device 206a provides a communication path for a user input. In one embodiment, the remote rendering device 206a includes an input device 253. The input device 253 may be a touchscreen, a keyboard, a mouse, or any other suitable device for receiving an input of a user. When a user input is detected, an input event receiver 251 receives data corresponding to the input event from the input device 253. The input event may reflect user actions such as clicking, scrolling, pressed icons, pinch/zooming, and the like, and may cause a change to the content displayed on the remote rendering device 206a. The remote rendering device 206a provides the input event data to the input event sender 249, which prepares the input event data for transmission over the communication network 240. The input event sender 249 provides the input event data to the packetizer 247. The content protection unit 245 may optionally encrypt the input event data. The remote rendering device 206a may transmit the input event data to other devices on the communication network 240, including the virtual web device 202a, via the network connector 221.

The virtual web device 202a may receive the input event data via the network connector 219, optionally decrypt the input event data utilizing the content protection unit 239, and de-packetize the input event data to reconstruct data of the user input event 243. The virtual web device 202a provides the user input event data 243 to the user interface 201, which updates elements of the user interface 201 based on the user input event 243. The updated elements may be incorporated into the render tree by the render tree sender 213.

According to an aspect of some embodiments of the present invention, neither the virtual web device 202, 202a nor the rendering device 206, 206a performs a full web browser implementation as a client device would in a typical mirroring approach. Instead, the virtual web device 202, 202a performs only DOM processing and formatting processing to construct a render tree, and reserves rendering (including painting and layout calculation) of the content for the remote rendering device 206, 206a. The virtual web device 202, 202a may not perform any rendering. The remote rendering device 206, 206a does not perform any DOM processing and instead performs only rendering. Thus, the remote rendering device 206 may be devoid of a DOM tree constructor or other component for performing DOM processing.

According to another embodiment, the virtual web device 202, 202a may perform some rendering but nevertheless does not transmit a screenshot of an entire browser screen to the remote rendering device 206, 206a. Instead, the virtual web device 202, 202a transmits render tree data to the remote rendering device 206, 206a.

By distributing rendering engine functionality on the client side across a virtual web device and one or more remote rendering devices, and performing only rendering locally on the remote rendering device, new applications and use cases for sharing Web-based content with (or among) remote rendering devices can be created. For example, as described in further detail below, a system for processing and displaying Web-based content according to some embodiments may be utilized to process and display WoT data.

Figure 6:
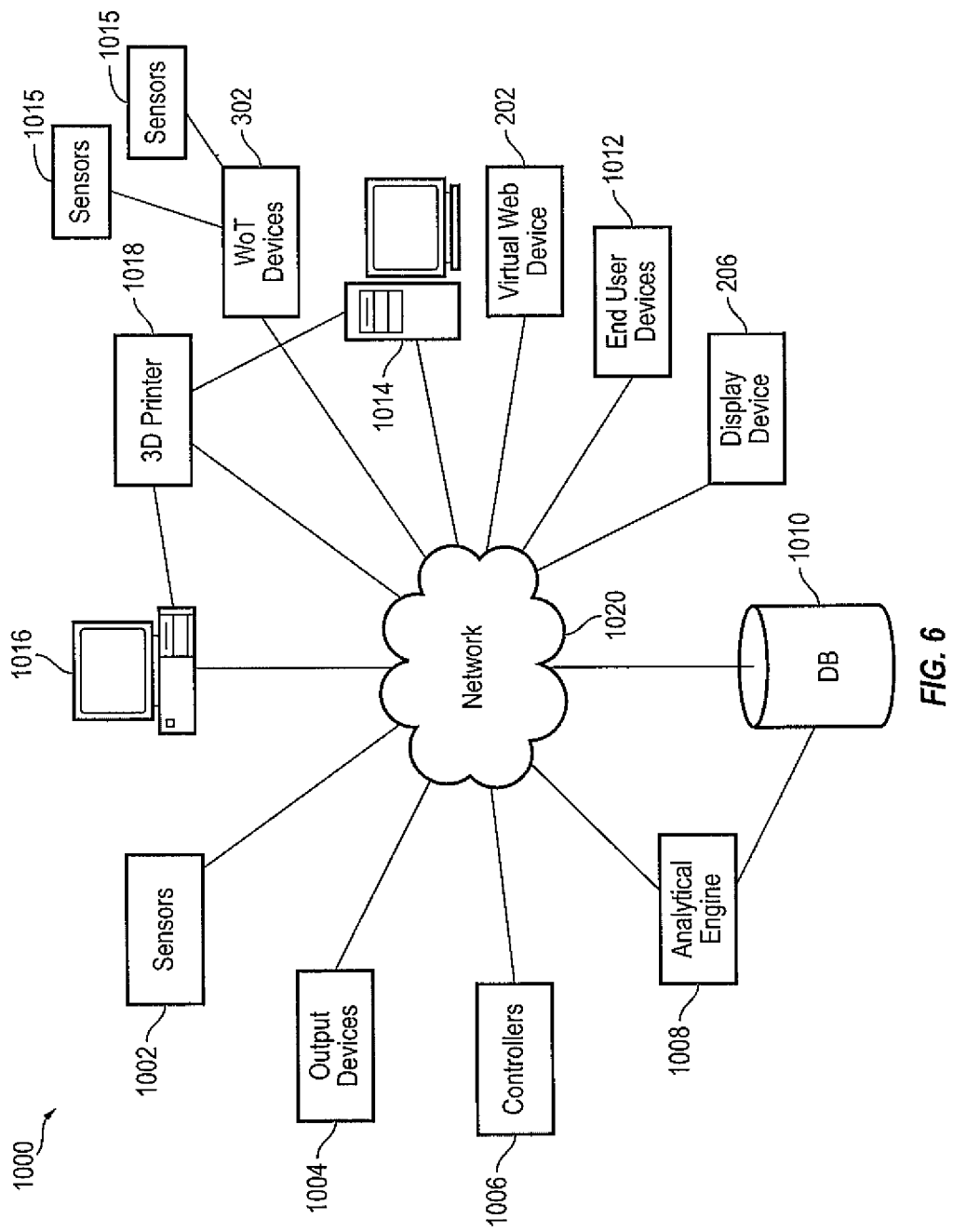
FIG. 6 illustrates an IoT architecture according to an embodiment of the present invention.

FIG. 6 illustrates an IoT architecture according to an embodiment of the present invention. A system for processing and displaying Web-based content according to an embodiment of the present invention may be applied to an IoT architecture or system 1000, in which various electronic devices (or IoT devices) 1002 through 1018 communicate with each other over a communication network 1020 to achieve results either with minimum or very little human intervention or without any human intervention (e.g., non-men-in-the-loop). The various electronic devices may include sensors 1002, output devices 1004, controllers 1006, one or more analytical engines 1008, one or more databases or mass storage devices 1010, end user electronic devices (e.g., personal computers, handheld personal computers, personal digital assistants, tablet or touch screen computer systems, mobile or cellular telephones, smartphones, or any other suitable consumer electronic devices) 1012, one or more remote rendering devices (or display devices) 206, a virtual web device 202, one or more WoT devices 302, one or more sensors 1015 associated with the WoT devices 302, one or more desktop or personal computer systems 1014 and 1016, and a three-dimensional (3D) printer system 1018.

Many of the end user devices 1012 may be mobile devices, such that the devices may be supplied with portable power source devices, such as rechargeable or replaceable batteries. Also, the form factor of each portable power source device may be influenced by the nature of the end user devices 1012. For example, the portable power source devices may be bendable, rollable, etc., for example, to support various configurations of the end user devices 1012 such as wearable devices that have various differing form factors.

Different devices and processors located at various different locations may be able to work together via the WoT to process the accumulated data and/or to work together to come up with a solution to a problem.

The electronic devices of the system 1000 may be in electrical communication with one another (e.g., using any suitable wired or wireless communication configuration and protocol) directly or by way of the communication network 1020. The communication network 1020 may be any suitable communication network, for example, a LAN or a WAN (e.g., a public Internet).

Over the network, which may be a computer network, the modularized components and/or devices and/or software can communicate with each other to jointly generate or obtain a solution. Also, because of the availability of data on an individual basis, any solutions that are produced can be customized (or tailored) to suit the requirements of the individuals at that time.

While the IoT is related to accumulation, processing and analysis of big data generated by sensors, and the implementation of solutions can be carried out without or with minimum human involvement, a man-machine interface (e.g., such as using a display such as one requiring a graphics user interface (GUI)) may be included in many situations for the devices to communicate with humans. Therefore, display devices (e.g., mobile display devices) such as remote rendering devices 206 may be included as part of the IoT architecture.

According to an embodiment, the sensors 1015 associated with the WoT devices 302 generate data that is accumulated and/or analyzed as WoT data to achieve a result. In many cases, the result or the decision may be achieved in real-time or in a much smaller amount of time than a human being would be capable of achieving. The WoT data may be collected by a cloud resource (e.g., a cloud server) for processing by the virtual web device 202. The virtual web device 202 may perform DOM processing and formatting processing to construct a render tree representing the WoT data, and may transmit render tree data corresponding to the constructed render tree to the remote rendering device 206 as described above with respect to FIG. 2. In one embodiment, where the WoT data is in HTML format instead of video or audio format, the virtual web device 202 may generate (or create) audio/video data for presenting (or displaying) the WoT data on the remote rendering device 206 in an audio, visual, or audiovisual format.

In one embodiment, the system for processing and displaying WoT data may be utilized without the virtual web device 202. In such a case, the WoT device 302 prepares the WoT data in a renderable format by itself constructing a render tree representing the WoT data, rather than utilizing the virtual web device 202 to perform this function. The WoT device 302 transmits render tree data (e.g., data packets corresponding to the render tree) to a remote rendering device 206 for rendering.

Figure 7:
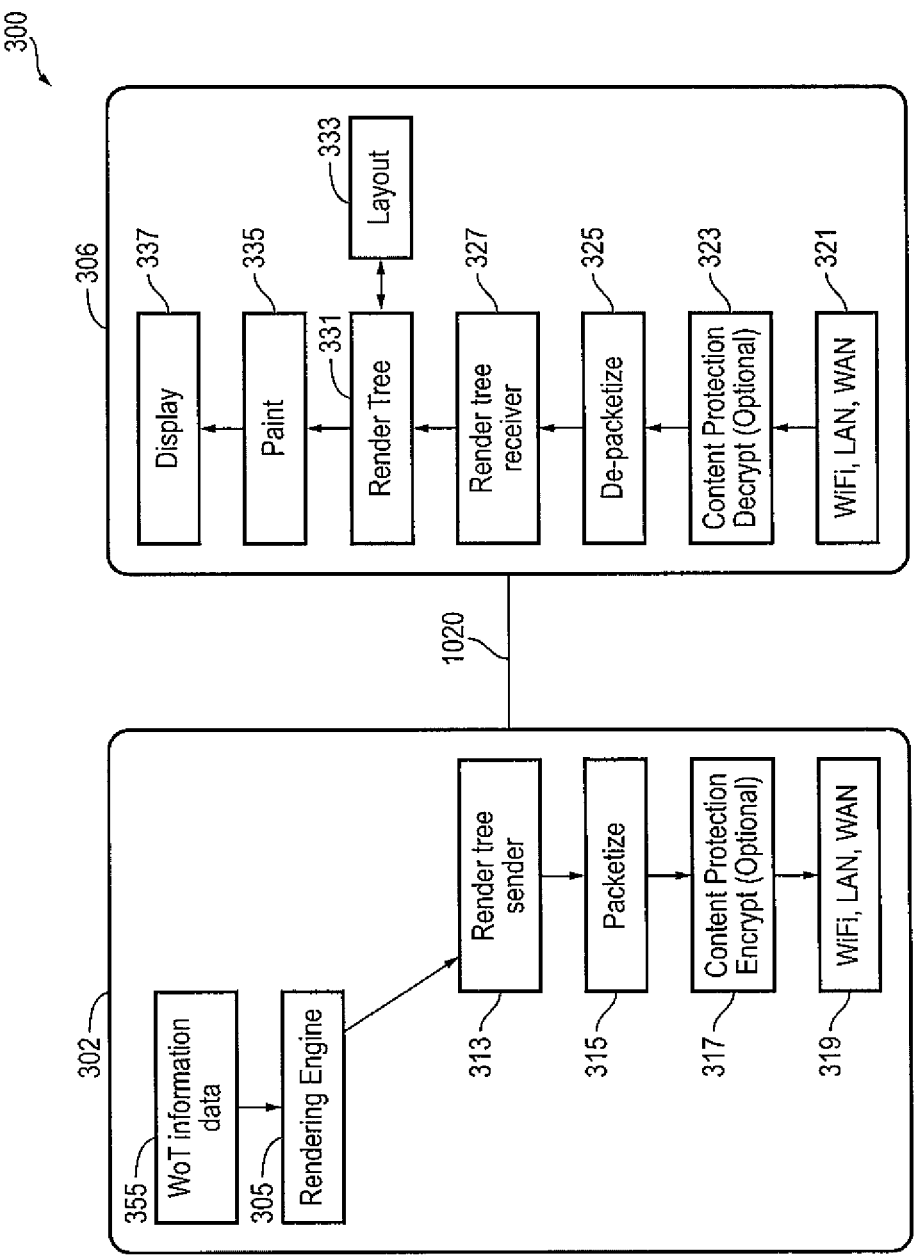
FIG. 7 illustrates a system architecture of a system for processing and displaying WoT data according to an embodiment of the present invention.

FIG. 7 illustrates a system architecture of a system for processing and displaying WoT data according to an embodiment. As shown, the system 300 includes a WoT device 302 and a remote rendering device 306 that communicate over the communication network 1020 via their respective network connectors 319 and 321. The WoT device 302 has several subsystems, including a WoT data feeder 355, a rendering engine 305, a render tree sender 313, a packetizer 315, a content protection unit 317, and the network connector 319. The WoT device 302 may further include a user interface and a data storage unit. The remote rendering device 306 also has several subsystems, including the network connector 321, a content protection unit 323, a depacketizer 325, a render tree receiver 327, a render tree 331, a layout calculator 333, a painter 335, and a display screen 337. The WoT device 302 and the remote rendering device 306 utilize their respective network connectors 319 and 321 to communicate with each other over a communication network 1020.

Some of the subsystems and functions of the WoT device 302 may be substantially the same as or similar to those of the virtual web device 202, 202a in FIGS. 2 and 5, and some of the subsystems and functions of the remote rendering device 306 may be substantially the same as or similar to those of the remote rendering device 206, 206a in FIGS. 2 and 5. As such, descriptions of similar subsystems and functions may not be repeated.

FIG. 7 also shows processing stacks for the WoT device 302 and the remote rendering device 306 according to an embodiment. A WoT data feeder of the WoT device 302 receives Web-based content, which may include data (e.g., sensor data) that is accumulated and/or analyzed as WoT information data 355. The WoT information data 355 may be locally generated by the WoT device 302 or it may be generated by one or more other devices and transmitted to the WoT device 302. In one embodiment, where the WoT information data 355 is in HTML format instead of video or audio format, the WoT device 302 may generate (or create) audio/video data for presenting (or displaying) the WoT information data 355 on the remote rendering device 306 in an audio, visual, or audiovisual format.

The rendering engine 305 analyzes (or interprets) the WoT information data 355 (e.g., HTML, XML, and image files) and formatting information (e.g., CSS, XSL, etc.) of the data. By parsing the content and formatting information, the rendering engine 305 can construct a render tree representing the WoT information data 355, as well as render trees representing other Web-based content, as described above with respect to FIGS. 2-4. The WoT device 302 may further include a user interface, a data persistence unit, a networking layer, a Java Script interpreter, or any other component suitable for implementing these and other similar functions. According to an embodiment, the WoT device 302 may also generate user interface data as a part of the render tree. The WoT device 302 transmits the generated render tree data to one or more remote rendering devices 306.

The render tree sender 313 receives the render tree data from the rendering engine 305 and prepares the render tree data for rendering by the remote rendering device 306 in a manner similar to that discussed above with respect to FIG. 2. After preparing the render tree data (or render tree data packets), the render tree sender 313 transmits the render tree data over a communication network 1020 to one or more remote rendering devices 306.

In one embodiment, the WoT device 302 constructs and transmits portions of the render tree data to the remote rendering device 306 as content (e.g., WoT information data 355) is received, rather than waiting for all of the content to be parsed.

The remote rendering device 306 receives, over the communication network 1020, data packets corresponding to the render tree constructed by the WoT device 302. The remote rendering device 306 may process the data packets to reconstruct the render tree as described above with respect to FIG. 2. The remote rendering device 306 may perform layout and painting processes on the render tree 331 as described above with respect to FIG. 2.

The remote rendering device 306 may also transmit information about itself over the communication network 1020. The information may be communicated to (or shared with) the WoT device 302 and other display devices (e.g., display devices having differing form factors), via the communication network 1020. The WoT device 302 may detect attributes of the remote rendering device 306 based on this information. For example, the WoT device 302 may generate the render tree data based on form factor data of a particular remote rendering device, prior to transmitting the render tree data to that device. As such, the render tree data may be customized (or optimized) for the remote rendering device to which it is sent. As another example, the WoT device 302 may determine an encoding format of the remote rendering device 306 and may perform transcoding of the WoT data based on the detected encoding format.

The remote rendering device 306 may be utilized as a display-only device that operates without an input device (e.g., without a keyboard, a mouse, a scanner, or a digital camera).

In another embodiment, the remote rendering device 306 may include an input device for receiving a user input and may provide a communication path for a user input as described above with respect to FIG. 5. Part of the user interface backend may be included as part of the remote rendering device 306 for painting the nodes of the render tree 331.

As such, according to an aspect of some embodiments of the present invention, WoT data may be processed locally on a WoT device in a renderable format, and the WoT device may bypass the web server in the cloud by constructing its own render tree. The WoT device may process the WoT data (e.g., by generating corresponding render tree data) based on detected attributes of a particular remote rendering device, prior to transmitting the render tree data directly to the remote rendering devices. Thus, a system for processing and displaying Web-based content according to some embodiments of the present invention can be used as the backend of a network of WoT devices for displaying (or presenting) WoT data and other Web-based content.

According to an aspect of some embodiments of the present invention, a remote display system distributes a rendering pipeline on the client side across a first device (e.g., a virtual web device or a WoT device) and one or more remote rendering devices in communication with the first device. By performing initial processing (e.g., DOM processing and formatting processing) of Web-based content on the first device, and generating and transmitting render tree data to a remote rendering device for local rendering, latency issues can be improved and bandwidth and power consumption can be reduced.

Further, by assigning a minimal intelligence to a remote rendering device, any pair of remote rendering device and virtual device (e.g., cloud-based virtual device) or WoT device can be implemented, regardless of form factor. A system for processing and displaying Web-based content according to some embodiments also provides a way to properly display (or present) the same content and data on multiple display devices having differing form factors.

While certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A virtual device for processing Web-based content to be displayed on a remote rendering device, the virtual device comprising:
a processor implemented by one or more cloud resources; and
a memory, wherein the memory stores instructions that, when executed, cause the processor to:
receive the Web-based content;
detect an attribute of the remote rendering device and process the Web-based content according to the detected attribute, the attribute comprising a form factor data of the remote rendering device and an encoding format of the remote rendering device;
analyze the Web-based content to construct a render tree corresponding to the Web-based content;
prepare render tree data for rendering by the remote rendering device, the render tree data corresponding to the constructed render tree; and
transmit the render tree data over a communication network to the remote rendering device,
wherein the Web-based content is generated by one or more other virtual devices and is received by the virtual device over the communication network, and
wherein the Web-based content comprises data written in HyperText Markup Language (HTML), and the instructions, when executed, further cause the processor to generate at least one of audio data or video data for displaying the Web-based content on the remote rendering device in an audio format, visual format, or an audiovisual format.

2. The virtual device of claim 1, wherein the instructions that cause the processor to prepare the render tree data comprise instructions for packetizing the render tree into data packets prior to transmission of the render tree data.

3. The virtual device of claim 1, wherein the instructions that cause the processor to transmit the render tree data comprise instructions for transmitting the render tree data to a plurality of remote rendering devices having differing form factors from one another.

4. The virtual device of claim 3, wherein the render tree is constructed based on the form factor data.

5. The virtual device of claim 3, wherein the instructions that cause the processor to process the Web-based content comprise instructions for transcoding the Web-based content based on the encoding format.

6. The virtual device of claim 1, wherein the instructions, when executed, further cause the processor to receive input event data from the remote rendering device and to update a user interface of the virtual device based on the input event data.

7. The virtual device of claim 1, wherein the instructions, when executed, further cause the processor to reserve rendering of the Web-based content for the remote rendering device.

8. The virtual device of claim 1, wherein the Web-based content comprises Web of Things (WoT) data generated by a remote WoT device.

9. A rendering device for displaying Web-based content, the rendering device comprising:
a processor; and
a memory, wherein the memory stores instructions that, when executed, cause the processor to:
transmit, over a communication network, information about the rendering device to a cloud resource, wherein the information about the rendering device comprises information corresponding to a form factor data of the rendering device and an encoding format of the rendering device;
receive, over the communication network, data packets corresponding to a render tree constructed by the cloud resource, the render tree representing the Web-based content;
reconstruct the render tree from the data packets;
compute layout data of nodes of the render tree, the nodes representing a structure of the Web-based content; and
traverse the render tree to paint the nodes on a display screen of the rendering device,
wherein the Web-based content is generated by one or more other cloud resources and is received by the cloud resource over the communication network, and
wherein the Web-based content comprises data written in HyperText Markup Language (HTML), and the instructions, when executed, further cause the cloud resource to generate at least one of audio data or video data for displaying the Web-based content on the rendering device in an audio format, visual format, or an audiovisual format.

10. The rendering device of claim 9, wherein the information about the rendering device further comprises information corresponding to at least one of: a supported video codec, a supported audio codec, Web Graphics Library (WebGL) support, or Web Computing Language (WebCL) support.

11. The rendering device of claim 9, wherein the instructions that cause the processor to receive the data packets from the cloud resource comprise instructions for de-packetizing the data packets.

12. The rendering device of claim 9, wherein the instructions, when executed, further cause the processor to receive input event data from an input device, and to transmit the input event data to the cloud resource.

13. The rendering device of claim 9, wherein the rendering device is a display-only device.

14. The rendering device of claim 9, wherein the rendering device is devoid of a DOM tree constructor.

15. The rendering device of claim 9, wherein the Web-based content comprises WoT data.

16. A Web of Things (WoT) device for processing WoT data to be displayed on a remote rendering device, the WoT device comprising:
   a processor; and
   a memory, wherein the memory stores instructions that, when executed, cause the processor to:
      receive the WoT data;
      detect an attribute of the remote rendering device and process the WoT data according to the detected attribute, the attribute comprising a form factor data of the remote rendering device and an encoding format of the remote rendering device;
      analyze the WoT data to construct a render tree corresponding to the WoT data;
      prepare render tree data for rendering by the remote rendering device, the render tree data corresponding to the constructed render tree; and
      transmit the render tree data over a communication network to the remote rendering device,
   wherein the WoT data is generated by one or more other WoT devices and is received by the WoT device over the communication network, and
   wherein the WoT data comprises data written in HyperText Markup Language (HTML), and the instructions, when executed, further cause the processor to generate at least one of audio data or video data for displaying the WoT data on the remote rendering device in an audio format, visual format, or an audiovisual format.

17. A system for processing Web-based content to be displayed, the system comprising:
   a first processor implemented on one or more cloud resources;
   a second processor on a remote rendering device; and
   a memory, wherein the memory stores instructions that, when executed, cause the first processor to:
      receive the Web-based content;
      detect an attribute of the remote rendering device and process the Web-based content according to the detected attribute, the attribute comprising a form factor data of the remote rendering device and an encoding format of the remote rendering device;
      analyze the Web-based content to construct a render tree corresponding to the Web-based content; and
      transmit render tree data corresponding to the constructed render tree over a communication network, to the remote rendering device,
   wherein the memory further stores instructions that, when executed, cause the second processor to:
      receive the render tree data as data packets;
      reconstruct the render tree from the data packets;
      compute layout data of nodes of the render tree, the nodes representing a structure of the Web-based content; and
      traverse the render tree to paint the nodes on a display screen of the remote rendering device,
   wherein the Web-based content is generated by one or more other cloud resources and is received by the one or more cloud resources over the communication network, and
   wherein the Web-based content comprises data written in HyperText Markup Language (HTML), and the instructions, when executed, further cause the first processor to generate at least one of audio data or video data for displaying the Web-based content on the remote rendering device in an audio format, visual format, or an audiovisual format.

* * * * *